S. ALLMAN.
BARREL-TRUCK.
No. 177,914.　　　　　Patented May 30, 1876.
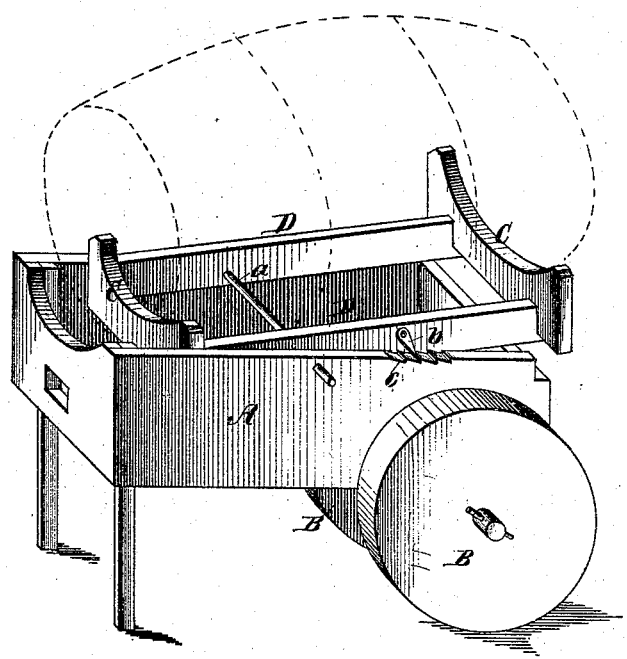
Witnesses.　　　　　Inventor.
C. A. Johnson　　　　Silas Allman
R. G. Orwig　　　By Thomas G. Orwig, atty

UNITED STATES PATENT OFFICE

SILAS ALLMAN, OF ATLANTIC, IOWA.

IMPROVEMENT IN BARREL-TRUCKS.

Specification forming part of Letters Patent No. 177,914, dated May 30, 1876; application filed February 1, 1876.

*To all whom it may concern:*

Be it known that I, SILAS ALLMAN, of Atlantic, in the county of Cass and State of Iowa, have invented a Combined Portable Truck and Adjustable Rack, of which the following is a specification:

The object of my invention is to furnish an apparatus especially adapted for supporting, moving about, and handling a cask or barrel containing liquid. It consists in mounting an adjustable rack upon a portable truck, as hereinafter fully set forth.

My drawing is a perspective view, illustrating the construction and operation of my invention.

A represents the body of the truck in the form of an oblong box. It may be framed or joined together in any suitable way, and vary in size as desired. B B are the wheels supporting the rear end of the body A. Suitable feet, attached at the front corners of the body, support the front end. C C are the end pieces of an adjustable rack. They are concave on their upper sides, conforming in shape with the barrel designed to rest therein, as indicated by broken lines. D D are the side pieces, rigidly connecting the end pieces C. *a* is a rod passed through the front portion of the side pieces D. Its ends project, and rest in suitable bearings formed in or on the sides of the body A. The rack is thereby hinged to the truck in such a manner that it can be readily adjusted to hold a barrel level, or at any angle desired to draw off or drain therefrom the liquid contents. *b* is a pawl pivoted to the rack, and designed to engage the serrated plate *c* on the truck, to hold the rack and the barrel thereon at the various angles required.

Broken lines indicate that a movable pole may be attached at the front end of the truck for guiding and moving the complete apparatus from place to place.

A simple, complete, and convenient means is thus provided for storing barrels and casks in such a manner that each one is upon an independent platform, readily moved about, and easily adjusted to facilitate the drawing off of its contents, through a faucet, into measures, as required by grocers, druggists, and all persons handling liquid merchandise.

I am aware that an adjustable and rotating platform, carrying a flexible and adjustable apron, has been mounted upon a truck for handling pipes in a plastic state; but I claim that my manner of mounting and adjusting a rack upon a truck to support, handle, and move barrels is novel and advantageous.

I claim as my invention—

The truck A B B, having a serrated plate or series of notches, *c*, the rack C D, having the pawl *b*, and the rod *a*, arranged and combined substantially as and for the purposes shown and described.

SILAS ALLMAN.

Witnesses:
W. S. PALMER,
THEO. CUSHING.